US012681487B2

(12) United States Patent
Iwahori et al.

(10) Patent No.: US 12,681,487 B2
(45) Date of Patent: Jul. 14, 2026

(54) APPARATUS, MOVING OBJECT, AND METHOD OF PRODUCING MOVING OBJECT

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP); Jyunya Katou, Toyota (JP); Kosei Minami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 19/047,258

(22) Filed: Feb. 6, 2025

(65) Prior Publication Data

US 2025/0271855 A1 Aug. 28, 2025

(30) Foreign Application Priority Data

Feb. 28, 2024 (JP) ................................. 2024-028012

(51) Int. Cl.
| | |
|---|---|
| *B62D 65/18* | (2006.01) |
| *G05D 1/227* | (2024.01) |
| *G05D 1/65* | (2024.01) |
| *G06Q 10/20* | (2023.01) |
| *G06Q 50/04* | (2012.01) |

(Continued)

(52) U.S. Cl.
CPC ............. *G05D 1/2278* (2024.01); *G05D 1/65* (2024.01); *G06Q 10/20* (2013.01); *G06Q 50/04* (2013.01); *G06T 7/0004* (2013.01);

*G06T 7/70* (2017.01); *G05D 2107/70* (2024.01); *G05D 2109/10* (2024.01); *G05D 2111/10* (2024.01); *G06T 2207/30252* (2013.01)

(58) Field of Classification Search
CPC ...... B62D 65/18; B62D 65/00; G05D 1/2278; G05D 2107/70; G06T 7/70; G05B 19/41805; G05B 19/41875
See application file for complete search history.

(56) References Cited

U.S. PATENT DOCUMENTS

| | | | | |
|---|---|---|---|---|
| 6,516,239 B1* | 2/2003 | Madden | ............. | G05B 19/4183 |
| | | | | 700/228 |
| 7,117,061 B1* | 10/2006 | McKenzie | ......... | G05B 19/4183 |
| | | | | 709/200 |

(Continued)

FOREIGN PATENT DOCUMENTS

| | | |
|---|---|---|
| JP | 2017-538619 A | 12/2017 |
| WO | 2023/249185 A1 | 12/2023 |

*Primary Examiner* — Tan Q Nguyen
(74) *Attorney, Agent, or Firm* — Oliff PLC

(57) ABSTRACT

An apparatus comprises an acquisition unit that acquires defect information regarding a defect of a moving object that moves on a production line by remote control; a parts identification unit that, in response to acquisition of the defect information, identifies a part that is assembled to a defective moving object from among a plurality of parts flowing on a parts line that merges with the production line at an assembly area where a part included in the plurality of the parts is assembled to the moving object; and an instruction unit that executes a moving object retraction instruction to remove the defective moving object from the production line and a part retraction instruction to remove the identified part from the parts line.

13 Claims, 9 Drawing Sheets

(51) Int. Cl.
   *G06T 7/00*       (2017.01)
   *G06T 7/70*       (2017.01)
   *G05D 107/70*      (2024.01)
   *G05D 109/10*      (2024.01)
   *G05D 111/10*      (2024.01)

(56)           References Cited

U.S. PATENT DOCUMENTS

| | | | |
|---|---|---|---|
| 2002/0152615 A1* | 10/2002 | Kurihara | B23P 21/004 |
| | | | 29/897 |
| 2005/0149216 A1* | 7/2005 | Popplewell | G05B 19/41805 |
| | | | 700/106 |
| 2007/0215435 A1* | 9/2007 | Tachibana | G05B 19/4189 |
| | | | 198/339.1 |
| 2010/0030353 A1* | 2/2010 | Koishi | G05B 19/4183 |
| | | | 700/96 |
| 2017/0320529 A1 | 11/2017 | Nordbruch | |
| 2017/0349228 A1* | 12/2017 | Hahn | B25J 9/0084 |
| 2021/0325847 A1* | 10/2021 | Prajapati | G05B 19/4063 |
| 2022/0214671 A1* | 7/2022 | Alt | G05B 19/41875 |
| 2022/0318984 A1* | 10/2022 | Hyatt | G06T 5/50 |
| 2023/0169642 A1* | 6/2023 | Floeder | G06V 10/82 |
| | | | 382/103 |

\* cited by examiner

APPARATUS, MOVING OBJECT, AND METHOD OF PRODUCING MOVING OBJECT

CROSS-REFERENCE TO RELATED APPLICATIONS

This application claims priority to Japanese Patent Application No. 2024-28012 filed on Feb. 28, 2024, which is incorporated herein by reference in its entirety.

BACKGROUND

Field

The present disclosure relates to an apparatus, a moving object, and a method of producing a moving object.

Related Art

Japanese Translation of PCT International Application Publication No. JP2017-538619 discloses a technique for causing vehicles to run by unmanned driving during vehicle production steps.

There is a known technique of merging a flow of moving objects with a flow of parts in an assembly area where parts are assembled to moving objects, such as vehicles, and then assembling the parts to the moving objects thus merged. For such a technique, it may be possible to transport moving objects to the assembly area by unmanned driving. However, ensuring proper assembly has not been considered in cases where a defect exists in the moving object being transported to the assembly area by unmanned driving.

SUMMARY

The present disclosure may be implemented by the following aspects.

According to a first aspect of the present disclosure, an apparatus is provided. The apparatus includes a first acquisition unit that acquires defect information regarding a defect of a moving object that moves on a production line by remote control; a parts identification unit that, in response to acquisition of the defect information, identifies a corresponding part from among a plurality of parts flowing on a parts line, the corresponding part being assembled to a defective moving object, the defective moving object being the moving object with the defect, the parts line merging with the production line at an assembly area where a part included in the plurality of parts is assembled to the moving object; and an instruction unit that executes a first instruction to remove the defective moving object from the production line and a second instruction to remove the corresponding part from the parts line.

DETAILED DESCRIPTION

A. First Embodiment

Figure 1:
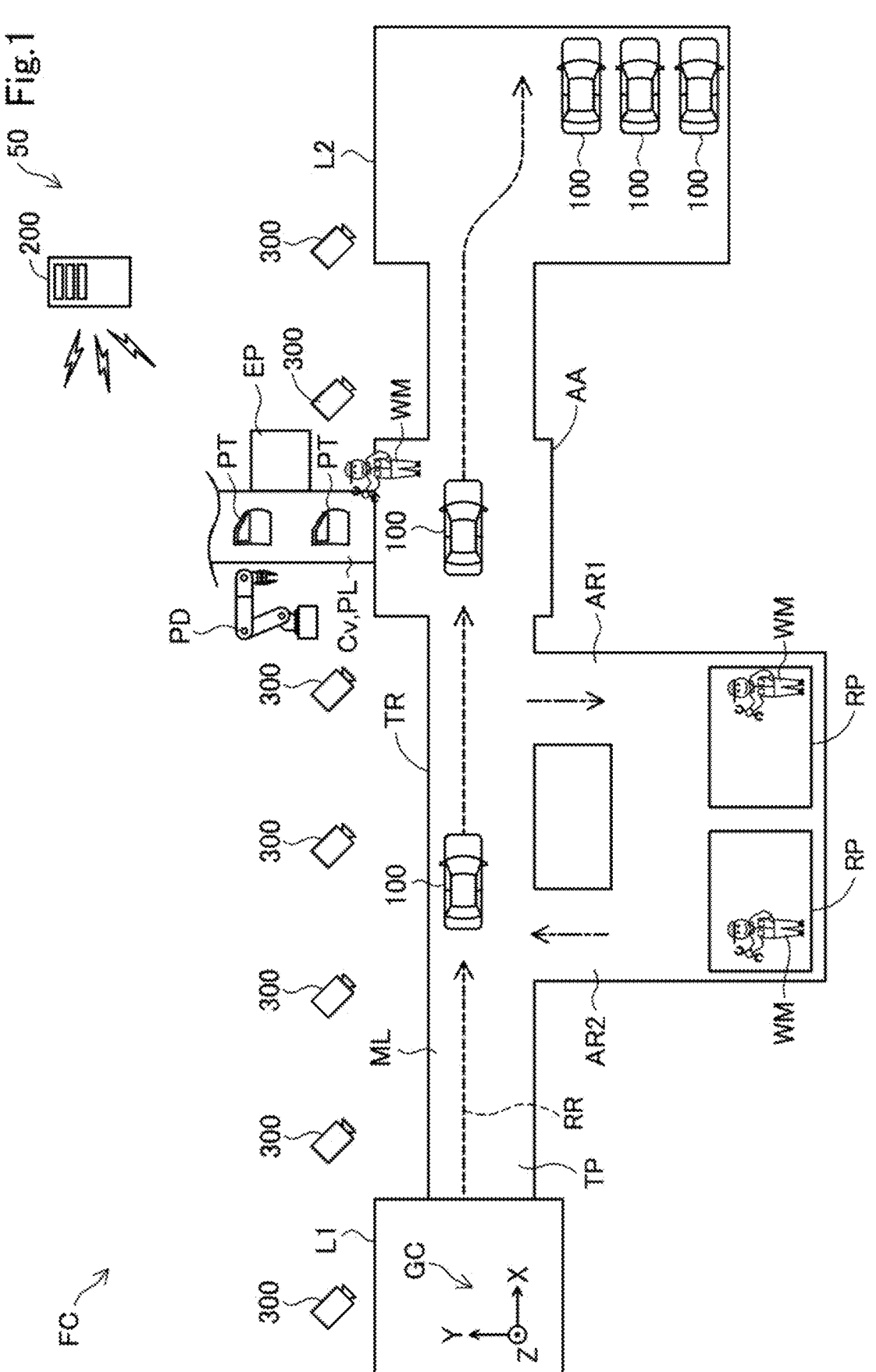
FIG. 1 is a conceptual diagram showing a configuration of a system according to a first embodiment.

FIG. 1 is a conceptual diagram showing a configuration of a system 50 according to a first embodiment. The system 50 includes one or more vehicles 100 as moving objects, a server 200, and one or more external sensors 300. The server 200 in the first embodiment corresponds to an "apparatus" in the present disclosure.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a truck, a bus, a two-wheel vehicle, a four-wheel vehicle, a combat vehicle, or a construction vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

The vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

In the present embodiment, the system 50 is used in a factory FC where the vehicle 100 is manufactured. The reference coordinate system of the factory FC is a global coordinate system GC, and any position in the factory FC is expressed with X, Y, and Z coordinates in the global coordinate system GC. The factory FC has a first place L1 and a second place L2. The first place L1 and the second place L2 are connected through a track TR on which the vehicle 100 can run. In the factory FC, a plurality of external sensors 300 are provided along the track TR. The position of each external sensor 300 in the factory FC is adjusted in advance. The vehicle 100 moves from the first place L1 to the second place L2 through the track TR by unmanned driving.

The factory FC has a production line ML and a parts line PL. The production line ML and the parts line PL merge at an assembly area AA. The production line ML is used to transport the vehicle 100. In the production line ML, the vehicle 100 is transported by running on the production line ML by unmanned driving. In the present embodiment, a part of the track TR corresponds to the production line ML. The parts line PL is a line for transporting a plurality of parts PT. The parts PT flowing on the parts line PL are assembled to the respective vehicles 100 to be manufactured in the factory FC. In the present embodiment, a conveyor device Cv for transporting the parts PT to the assembly area AA corresponds to the parts line PL. In the assembly area AA, assembly of the part PT to the vehicle 100 is performed by, for example, a robot or a worker WM. To ensure that the assembly in the assembly area AA is smoothly done, it is preferable that the vehicle 100 and its corresponding part PT arrive at the assembly area AA in a timely manner.

It is sufficient that the parts line PL is configured to enable the parts PT to be transported to the assembly area AA in sequence; accordingly, the form and shape of the parts line PL are not particularly limited. For example, the parts line PL is not limited to a line having the conveyor device Cv, but may also be a line with a hanger that moves the parts PT while suspending parts PT or a line with an automatic guided vehicle (AGV) for transporting the parts PT.

The vehicles 100 flowing along the production line ML can be retracted to the outside of the production line ML. Further, the vehicle 100 having been retracted to the outside of the production line ML can return to the production line ML. Hereinafter, retracting the vehicle 100 to the outside of the production line ML is also simply referred to as "retraction of the vehicle 100". Returning the vehicle 100 to the production line ML is also simply referred to as "return of the vehicle 100". When the vehicle 100 is retracted, the vehicle 100 moves to, for example, an auxiliary track TP, a first track AR1, a second track AR2, or a repair place RP. The auxiliary track TP is a track extending along the production line ML, and is aligned with the production line ML in the vehicle width direction of the track TR. The first track AR1 leads the vehicle 100 from the production line ML to the repair place RP. The second track AR2 leads the vehicle 100 from the repair place RP to the production line ML. The repair place RP is a place where defects (described below) are fixed. In the present embodiment, the retraction and return of the vehicle 100 are accomplished by unmanned driving of the vehicle 100. In alternative embodiments, the retraction and return of the vehicle 100 may be accomplished by, for example, running operation of the vehicle 100 by the worker WM as a passenger, transport using the wheels of the vehicle 100 by the worker WM or a robot, or transport without using the wheels of the vehicle 100.

Figure 2:
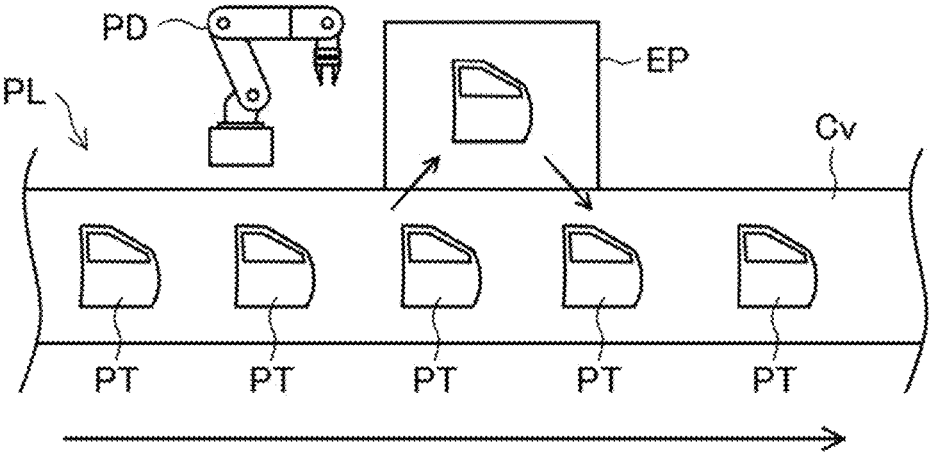
FIG. 2 is a conceptual diagram describing retraction and return of parts.

FIG. 2 is a conceptual diagram describing the retraction and return of the parts PT. The parts PT flowing on the parts line PL can be retracted to the outside of the parts line PL. Further, the parts PT retracted to the outside of the parts line PL can be returned to the parts line PL. Hereinafter, retracting the parts PT to the outside of the parts line PL is also simply referred to as "retraction of the parts PT". Returning the parts PT to the parts line PL is also simply referred to as "return of the parts PT". In the present embodiment, when the parts PT are retracted, the parts PT are moved to a retracted position EP outside the parts line PL. In the present embodiment, the retraction and return of the parts PT are accomplished by a parts handling device PD provided in the vicinity of the parts line PL. The parts handling device PD is configured by, for example, a robot. In addition to execution of the retraction and return of the parts PT, the parts handling device PD in the present embodiment is configured to be capable of changing the positions of the parts PT in the parts line PL.

In alternative embodiments, the retraction and return of the parts PT may not be accomplished by the parts handling device PD. For example, as in the present embodiment, if the parts line PL is configured as a line having the conveyor device Cv, the parts PT may be retracted by changing the transport direction of the conveyor in the vicinity of the retracted position EP. Further, a conveyor for returning the parts PT may be provided at the retracted position EP, and the parts PT may be returned using the conveyor for returning.

Figure 3:
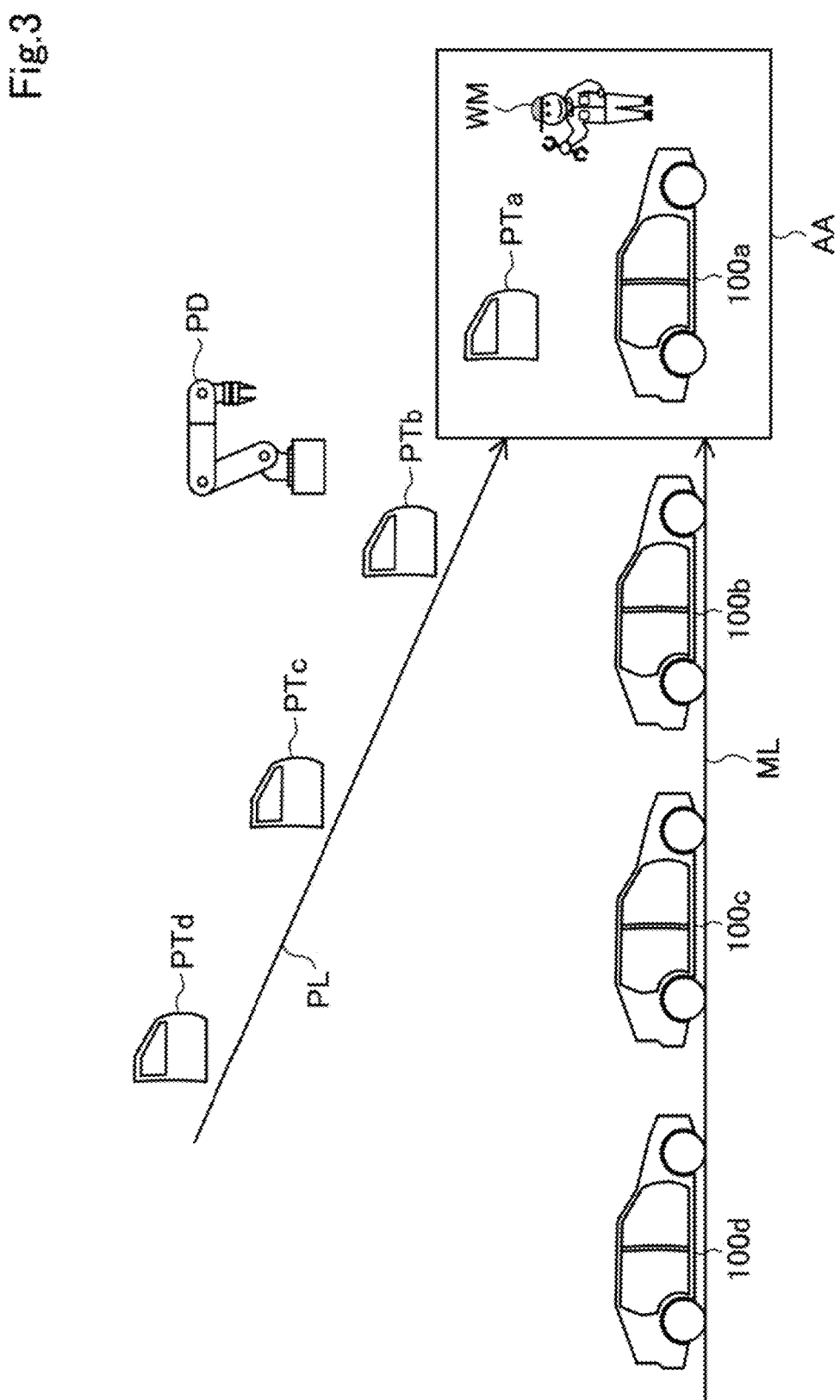
FIG. 3 is a conceptual diagram describing correspondence between vehicles and parts in each line.

FIG. 3 is a conceptual diagram describing the correspondence between each vehicle 100 on the production line ML and each part PT on the parts line PL. Parts PTa, PTb, PTc, and PTd, which respectively correspond to vehicles 100a, 100b, 100c, and 100d shown in FIG. 3 on a one-to-one basis, are assembled to these vehicles. The correspondence between each vehicle 100 and each part PT is managed using, for example, the identification number of the vehicle 100. Each of the vehicles 100 shown in FIG. 3 arrives at the assembly area AA in order of the vehicle 100a, the vehicle 100b, the vehicle 100c, and the vehicle 100d. Each of the parts PT shown in FIG. 2 arrives at the assembly area AA in order of the part PTa, the part PTb, the part PTc, and the part PTd, corresponding to the order of arrival of the vehicles 100.

Figure 4:
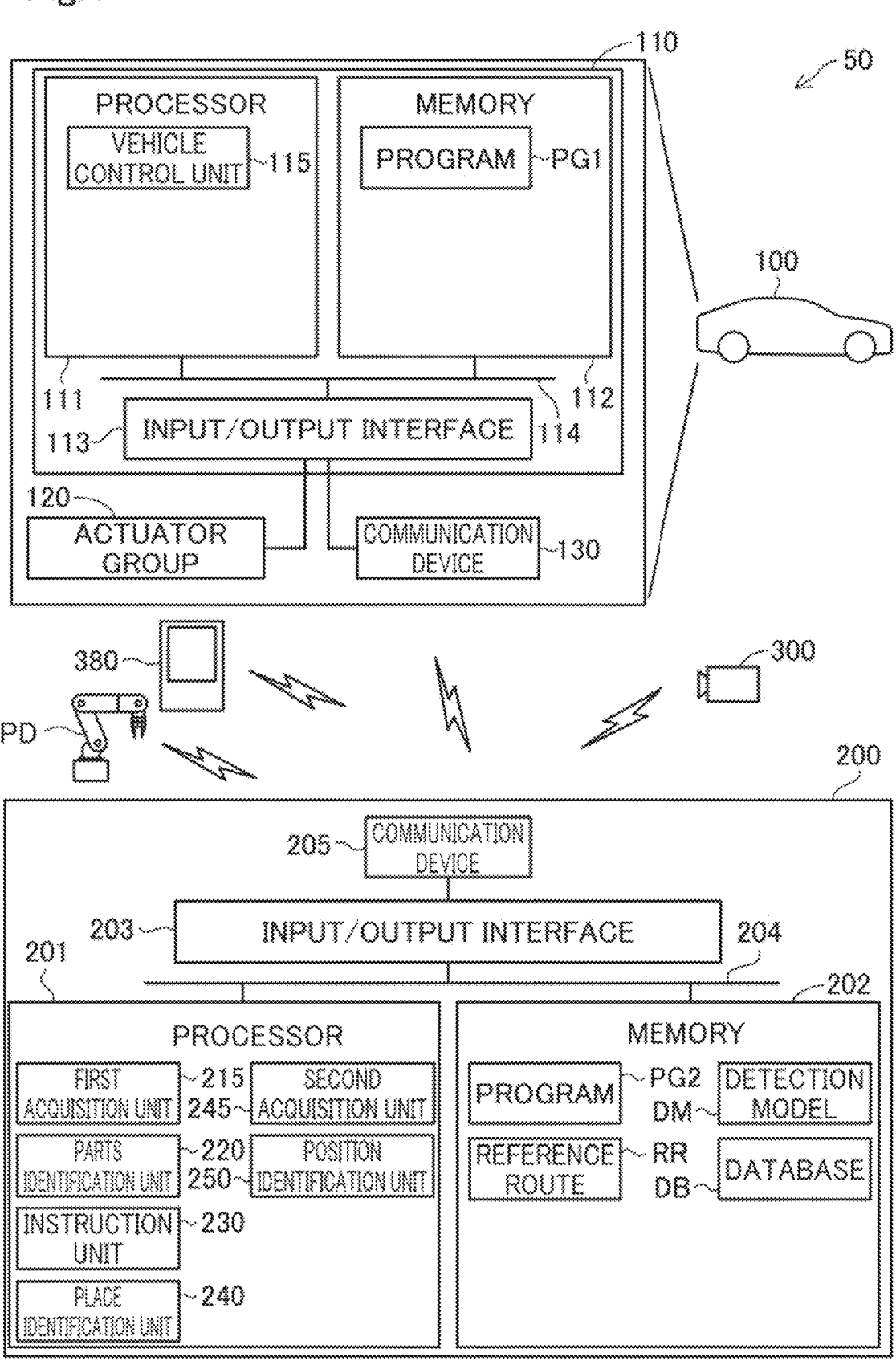
FIG. 4 is a block diagram showing a configuration of the system according to the first embodiment.

FIG. 4 is a block diagram showing a configuration of the system 50. The vehicle 100 includes a vehicle controller 110 for controlling various units of the vehicle 100, an actuator group 120 including one or more actuators driven under the control of the vehicle controller 110, and a communication device 130 for communicating with external devices, such as the server 200, via wireless communication. The actuator group 120 includes an actuator of a driving device for accelerating the vehicle 100, an actuator of a steering device for changing a traveling direction of the vehicle 100, and an actuator of a braking device for decelerating the vehicle 100.

The vehicle controller 110 is configured by a computer with a processor 111, a memory 112, an input/output interface 113, and an internal bus 114. The processor 111, the memory 112, and the input/output interface 113 are connected via the internal bus 114 to enable bidirectional communication. The actuator group 120 and the communication device 130 are connected to the input/output interface 113. The processor 111 executes a program PG1 stored in the memory 112 to implement various functions including a function as a vehicle control unit 115.

The vehicle control unit 115 controls the actuator group 120 to cause the vehicle 100 to run. The vehicle control unit 115 controls the actuator group 120 using a running control signal received from the server 200, thereby causing the vehicle 100 to run. The running control signal is a control signal for enabling the vehicle 100 to run. In the present embodiment, the running control signal includes an acceleration and a steering angle of the vehicle 100 as parameters. In other embodiments, the running control signal may include the speed of the vehicle 100 as a parameter instead of or in addition to the acceleration of the vehicle 100.

The server 200 includes a computer with a processor 201, a memory 202, an input/output interface 203, and an internal bus 204. The processor 201, the memory 202, and the input/output interface 203 are connected via the internal bus 204 to enable bidirectional communication. The input/output interface 203 is connected to a communication device 205 for enabling communication with various devices outside the server 200. The communication device 205 is capable of communication with the vehicle 100 and a terminal device 380 owned by a user via wireless communication, and is also capable of communication with each of the external sensors 300 and the parts handling device PD via wired or wireless communication. The user here refers to a user of the system 50 or the factory FC, such as a manager or the worker WM of the factory FC. The processor 201 executes a program PG2 stored in the memory 202 to perform various functions including functions as a first acquisition unit 215, a parts identification unit 220, an instruction unit 230, a place identification unit 240, a second acquisition unit 245, and a position identification unit 250.

The first acquisition unit 215 acquires defect information. The defect information is information regarding a defect of the vehicle 100 running on the production line ML. Hereinafter, the vehicle 100 with a defect is also referred to as a defective vehicle. For example, the first acquisition unit 215 may acquire the defect information by detecting defects using the external sensor 300, or may acquire the defect information input by the user. The defect information may be transmitted to the server 200, for example, via the terminal device 380. The first acquisition unit 215 is also simply referred to as an "acquisition unit".

For example, the defect information may be information indicating the defective part of the vehicle 100 or information indicating the type of the defect, such as a mechanical defect, an electrical defect, or a defect in appearance. The defect information may be information indicating the type of the defect for each part of the vehicle 100.

When the defect information is acquired, the parts identification unit 220 identifies a corresponding part for the defective vehicle from among the plurality of parts PT flowing on the parts line PL. The corresponding part is a part to be assembled to a defective vehicle. For example, the parts identification unit 220 identifies the corresponding part by identifying the dentification number of the corresponding part or order of the corresponding part in the parts line PL based on the identification number of the defective vehicle or the order of the defective vehicle in the production line ML.

The instruction unit 230 in the present embodiment functions as a remote control unit, as necessary. The remote control unit generates a running control signal and transmits the generated running control signal to the vehicle 100, thereby causing the vehicle 100 to run by remote control. In other words, the instruction unit 230 issues a remote instruction to the vehicle 100 for causing the vehicle 100 to run by remote control. The "issuance of instruction to the target, such as the vehicle 100, by the instruction unit 230" is also referred to as "execution of instruction with respect to the target by the instruction unit 230".

The instruction unit 230 executes a vehicle retraction instruction and a part retraction instruction. Also, the instruction unit 230 in the present embodiment further executes a vehicle entry instruction, a part entry instruction, a repair instruction, a vehicle return instruction, and a part return instruction. The vehicle retraction instruction is also referred to as a first retraction instruction. The part retraction instruction is also referred to as a second retraction instruction. Further, the vehicle entry instruction is also simply referred to as an "entry instruction".

The vehicle retraction instruction refers to an instruction for removing a defective vehicle from the production line ML. In the vehicle retraction instruction of the present embodiment, the instruction unit 230 generates a running control signal for causing the defective vehicle to run to the outside of the production line ML and transmits the generated running control signal to the defective vehicle. That is, the vehicle retraction instruction in the present embodiment is an instruction for removing a defective vehicle from the production line ML by remote control. As described later, the vehicle retraction instruction in the present embodiment is performed by the repair instruction.

The part retraction instruction refers to an instruction for removing the corresponding part from the parts line PL. In the part retraction instruction of the present embodiment, the instruction unit 230 transmits to the parts handling device PD a control command for moving the corresponding part from the parts line PL to the retracted position EP.

The vehicle entry instruction refers to instructing a subsequent vehicle to enter a first vacant space. The subsequent vehicle is a vehicle subsequent to the defective vehicle. The first vacant space is generated by removal of the defective vehicle from the production line ML by the vehicle retraction instruction. In other words, the first vacant space refers to a vacant space corresponding to the region originally occupied by the defective vehicle on the production line ML. In the vehicle entry instruction of the present embodiment, the instruction unit 230 generates a running control signal for causing the subsequent vehicle to enter the first vacant space, and transmits the generated running control signal to the subsequent vehicle. Further, in the present embodiment, the running control signal generated by the vehicle entry instruction is a running control signal for decreasing the degree of deceleration of the subsequent vehicle to be smaller than the degree of deceleration of the preceding vehicle. The preceding vehicle is a vehicle 100 that comes ahead of the subsequent vehicle when the defective vehicle is retracted. Specifically, the instruction unit 230 generates a running control signal for preventing the subsequent vehicle from decelerating more than the preceding vehicle when the preceding vehicle slows down, and transmits the running control signal to the subsequent vehicle.

The part entry instruction refers to an instruction to be given to a device configured to be capable of changing the positions of the parts PT flowing on the parts line PL. The part entry instruction is to cause a subsequent part to enter a second vacant space. The subsequent part is a part PT subsequent to the corresponding part. The second vacant space is by removal of the corresponding part from the parts line PL by the part retraction instruction. In other words, the second vacant space refers to a vacant space corresponding to the region originally occupied by the corresponding part on the parts line PL. In the part entry instruction of the present embodiment, the instruction unit 230 transmits to the parts handling device PD a control command for moving the subsequent part to the second vacant space.

The repair instruction refers to instructing the defective vehicle to move to the repair place RP for fixing the defect. In the repair instruction of the present embodiment, the instruction unit 230 generates a running control signal for causing the defective vehicle to run to the repair place RP and transmits the generated running control signal to the defective vehicle. Upon reception of the repair instruction, the vehicle 100 runs to the repair place RP, for example, through the auxiliary track TP and the first track AR1. As described later, in the present embodiment, the repair place RP is identified by the place identification unit 240.

The vehicle return instruction refers to instructing a repaired vehicle in which the defect has been repaired to enter the production line ML. The instruction unit 230 executes the vehicle return instruction when completion information is acquired. The completion information refers to information regarding completion of the repair of a defect in the defective vehicle. As described later, the completion information is acquired by the second acquisition unit 245. In the vehicle return instruction in the present embodiment, the instruction unit 230 generates a running control signal for causing the repaired vehicle to run to the production line ML, and transmits the generated running control signal to the repaired vehicle. Upon reception of the vehicle return instruction, the vehicle 100 runs toward the production line ML through the second track AR2 and the auxiliary track TP, and enters the production line ML.

The part return instruction refers to an instruction to cause the corresponding part that has been removed from the parts line PL to be inserted into an interruption position on the parts line PL. In the part return instruction in the present embodiment, the instruction unit 230 transmits to the parts handling device PD a control command for moving the corresponding part to the interruption position. As described later, the interruption position is identified by the position identification unit 250.

The place identification unit 240 identifies the repair place RP according to the defect information. The place identification unit 240 in the present embodiment identifies a repair place RP corresponding to the defect, from among a plurality of candidate repair places RP. The place identification unit 240 identifies the repair place RP, for example, by referring to a database DB in which the part of the vehicle 100 or the type of the defect is associated with a repair place RP suitable for fixing the part or the type of the defect based on the defect information.

The second acquisition unit 245 acquires the completion information. The completion information may be transmitted to the server 200, for example, via the terminal device 380. The completion information may also be transmitted to the server 200, for example, from a device in charge of fixing the defective vehicle.

The position identification unit 250 identifies the interruption position using return place information. The return place information refers to information indicating the place at which the repaired vehicle enters the production line ML, i.e., the return place at which the repaired vehicle returns to the production line ML. The return place may be identified, for example, according to the repair place RP, or may be identified by using the external sensor 300. The position identification unit 250 identifies the interruption position using the return place information so that the corresponding part arrives at the assembly area AA in response to the repaired vehicle that has returned to the production line ML from the return place and is moving toward the assembly area AA. It is preferable to identify the interruption position so that the corresponding part arrives at the assembly area AA in response to the repaired vehicle in a timely manner.

The external sensor 300 is a sensor located outside the vehicle 100. The external sensor 300 in the present embodiment is a sensor that captures the vehicle 100 from outside of the vehicle 100. Specifically, the external sensor 300 is configured by a camera. The camera as the external sensor 300 captures images of the vehicle 100 and outputs the captured images as detection results. The external sensor 300 includes a communication device (not shown), and is capable of communication with other devices, such as the server 200, via wired or wireless communication.

Figure 5:
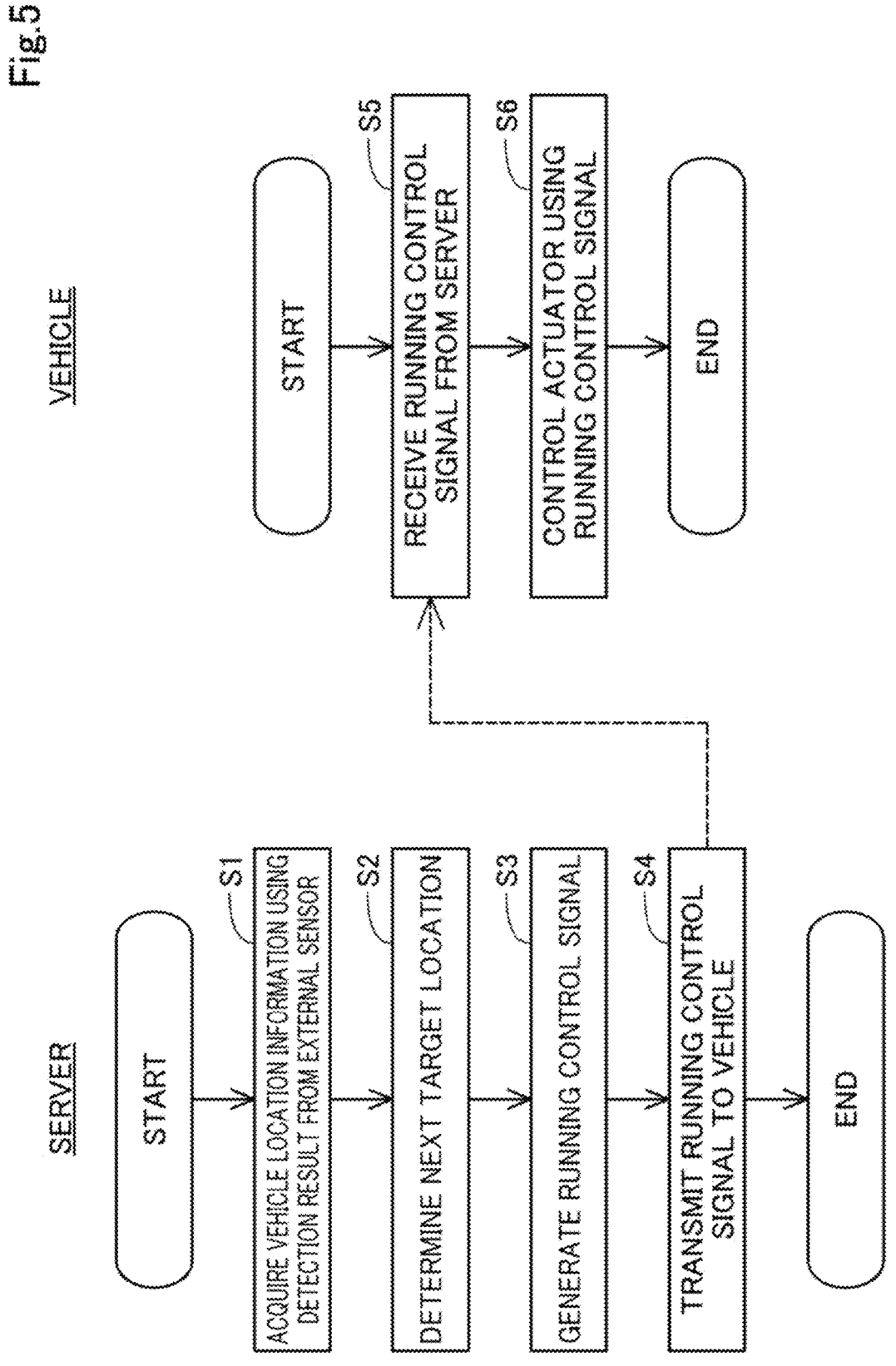
FIG. 5 is a flowchart showing procedures in the process of running control of a vehicle in the first embodiment.

FIG. 5 is a flowchart showing procedures in the process of running control of the vehicle 100 in the first embodiment. In the procedures of the process in FIG. 5, the processor 201 of the server 200 functions as a remote control unit by executing the program PG2. Further, the processor 111 of the vehicle 100 functions as the vehicle control unit 115 by executing the program PG1.

In step S1, the processor 201 of the server 200 acquires vehicle location information using detection result output from the external sensor 300. The vehicle location information is locational information as a basis for generating a running control signal. In the present embodiment, the vehicle location information includes the location and orientation of the vehicle 100 in the global coordinate system GC of the factory FC. Specifically, in step S1, the processor 201 acquires the vehicle location information using the captured image acquired from the camera as the external sensor 300.

More specifically, in step S1, the processor 201 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system GC, thereby acquiring the location of the vehicle 100. The outer shape of the vehicle 100 in the captured image may be detected by inputting the captured image to a detection model DM using artificial intelligence, for example. The detection model DM is prepared in the system 50 or outside the system 50. The detection model DM is stored in advance in the memory 202 of the server 200, for example. An example of the detection model DM is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The processor 201 can acquire the orientation of the vehicle 100 through estimation based on the direction of a motion vector of the vehicle 100 detected from change in location of a feature point of the vehicle 100 between frames of the captured images using optical flow process, for example.

In step S2, the processor 201 of the server 200 determines a target location to which the vehicle 100 is to move next. In the present embodiment, the target location is expressed by X, Y, and Z coordinates in the global coordinate system GC. The memory 202 of the server 200 contains a reference route RR stored in advance as a route along which the vehicle 100 is to run. The route is expressed by a node indicating a departure place, a node indicating a way point, a node indicating a destination, and a link connecting nodes to each other. The processor 201 determines the target location to which the vehicle 100 is to move next using the vehicle location information and the reference route RR. The processor 201 determines the target location on the reference route RR ahead of a current location of the vehicle 100.

In step S3, the processor 201 of the server 200 generates a running control signal for causing the vehicle 100 to run toward the determined target location. The processor 201 calculates a running speed of the vehicle 100 from transition of the location of the vehicle 100 and makes comparison between the calculated running speed and a target speed of the vehicle 100 determined in advance. If the running speed is lower than the target speed, the processor 201 generally determines an acceleration in such a manner as to accelerate the vehicle 100. If the running speed is higher than the target speed as, the processor 201 generally determines an acceleration in such a manner as to decelerate the vehicle 100. If the vehicle 100 is on the reference route RR, the processor 201 determines a steering angle and an acceleration in such a manner as to prevent the vehicle 100 from deviating from the reference route RR. If the vehicle 100 is not on the reference route RR, in other words, if the vehicle 100 deviates from the reference route RR, the processor 201 determines a steering angle and an acceleration in such a manner as to return the vehicle 100 to the reference route RR.

In step S4, the processor 201 transmits the generated running control signal to the vehicle 100. The processor 201 repeats the acquisition of vehicle location information, the determination of a target location, the generation of a running control signal, the transmission of the running control signal, and others in a predetermined cycle.

In step S5, the processor 111 of the vehicle 100 receives the running control signal transmitted from the server 200. In step S6, the processor 111 of the vehicle 100 controls the actuator group 120 of the vehicle 100 using the received running control signal, thereby causing the vehicle 100 to run at the acceleration and the steering angle indicated by the running control signal. The processor 111 repeats the reception of a running control signal and the control over the actuator group 120 in a predetermined cycle. According to the system 50 in the present embodiment, it becomes possible to move the vehicle 100 without using a transport unit such as a crane or a conveyor.

Figure 6:
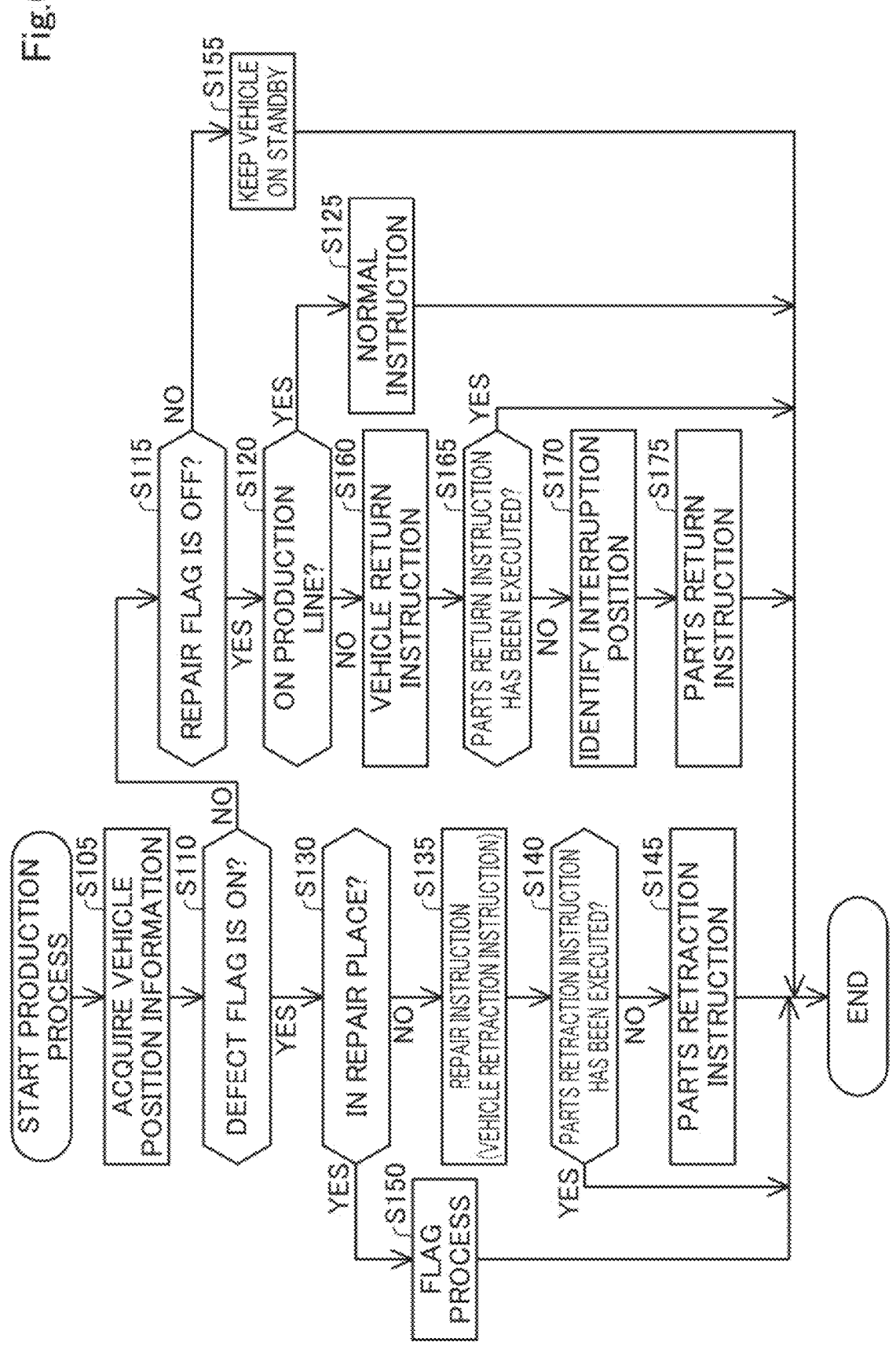
FIG. 6 is a flowchart of production process.

FIG. 6 is a flowchart of the production process for performing a production method of the vehicle 100 in the present embodiment. While the running control in FIG. 5 is executed, the processor 201 performs the production process in FIG. 6, for example, at predetermined time intervals. Hereinafter, the vehicle 100 subjected to the production process is also referred to as a target vehicle 100. While the production process is performed, the first acquisition unit 215 determines, at predetermined time intervals, whether the defect information for the target vehicle 100 has been received, and, if it is determined that the defect information has been received, the first acquisition unit 215 turns on a defect flag. Further, while the production process is performed, the second acquisition unit 245 determines, at predetermined time intervals, whether the completion information for the target vehicle 100 has been received, and, if it is determined that the completion information has been received, the second acquisition unit 245 turns off a repair flag. In the step S150, which is described later, the defect flag is turned off and the repair flag is turned on.

In the following, first, a normal process is described. The normal process is performed after the target vehicle 100 starts running on the production line ML or after the target vehicle 100 returns to the production line ML, before the defect information for the target vehicle 100 is acquired. In the normal process, the steps S105, S110, S115, S120, and S125 are performed.

In the step S105, the instruction unit 230 acquires vehicle position information regarding the target vehicle 100 using the detection result obtained from the external sensor 300. In the step S110, the instruction unit 230 determines whether the defect flag is ON. If the defect flag is OFF in the step S110, in the step S115, the instruction unit 230 determines whether the repair flag is OFF. If the repair flag is OFF in the step S115, in the step S120, the instruction unit 230 determines whether the target vehicle 100 is on the production line ML. In the step S120, the instruction unit 230 determines whether the target vehicle 100 is on the production line ML, for example, based on the vehicle position information acquired in the step S105.

If it is determined that the target vehicle 100 is on the production line ML in the step S120, the instruction unit 230 executes a normal instruction in the step S125. The normal instruction refers to an instruction to cause the vehicle 100 on the production line ML to be transported on the production line ML. In the step S125, the instruction unit 230 generates a running control signal for causing the target vehicle 100 to run on the production line ML based on the vehicle position information acquired in the step S105, and transmits the generated running control signal to the target vehicle 100.

Next, a pre-repair process is described below. The pre-repair process is executed after the defect information is acquired and before the target vehicle 100 arrives at the repair place RP. In the pre-repair process, the steps S105, S110, S115, S130, S135, S140, S145, and S150 are performed.

If the defect flag is ON in the step S110, in the step S130, the instruction unit 230 determines whether the target vehicle 100 is at the repair place RP. In the step S130, the instruction unit 230 determines whether the target vehicle 100 is at the repair place RP, for example, based on the vehicle position information. The instruction unit 230 may determine whether the target vehicle 100 is at the repair place RP, for example, using an area sensor (not shown) provided in the factory FC.

If it is determined that the target vehicle 100 is not at the repair place RP in the step S130, the instruction unit 230 executes the repair instruction in the step S135. If the target vehicle 100 is on the production line ML at the start of the step S135, the target vehicle 100 runs toward the repair place RP outside the production line ML in the step S135. In other words, the retraction instruction takes place. In contrast, if the target vehicle 100 is outside the production line ML at the start of the step S135, the target vehicle 100 continues running to the repair place RP. In the present embodiment, the identification of the repair place RP by the place identification unit 240 may be performed at any timing after the defect information is acquired and before the step S130 is started.

In the step S140, the instruction unit 230 determines whether the part retraction instruction has already been executed. If it is determined that the part retraction instruction has not been executed in the step S140, the instruction unit 230 executes the part retraction instruction in the step S145.

If the vehicle 100 is at the repair place RP in the step S130, the instruction unit 230 executes a flag process in the step S150. The flag process is to turn off the defect flag and turn on the repair flag.

Next, an in-repair process is described below. The in-repair process is executed after the target vehicle 100 is moved to the repair place RP and before the repair of the target vehicle 100 is completed. During the in-repair process, the steps S105, S110, S115, and S155 are performed. If the repair flag is ON in the step S115, the instruction unit 230 allows the target vehicle 100 to wait at the repair place RP in the step S155. In the step S155, the instruction unit 230 generates a running control signal for allowing the target vehicle 100 to wait at the repair place RP, and transmits the generated running control signal to the target vehicle 100. In alternative embodiments, the instruction unit 230 may, for example, stop the transmission of the running control signal to the target vehicle 100, thereby causing the target vehicle 100 to wait at the repair place RP.

Next, a return process is described below. The return process is executed after the repair of the target vehicle 100 is completed and before the target vehicle 100 returns to the production line ML. During the return process, the steps S105, S110, S115, S120, S160, S165, S170, and S175 are performed. If the target vehicle 100 is not on the production line ML in the step S120, the instruction unit 230 executes the vehicle return instruction in the step S160.

In the step S165, the instruction unit 230 determines whether the part return instruction has already been executed. If it is determined that the part return instruction has not been executed in the step S165, the position identification unit 250 identifies the interruption position in the step S170. In the step S175, the instruction unit 230 executes the part return instruction using the interruption position identified in the step S170.

Figure 7:
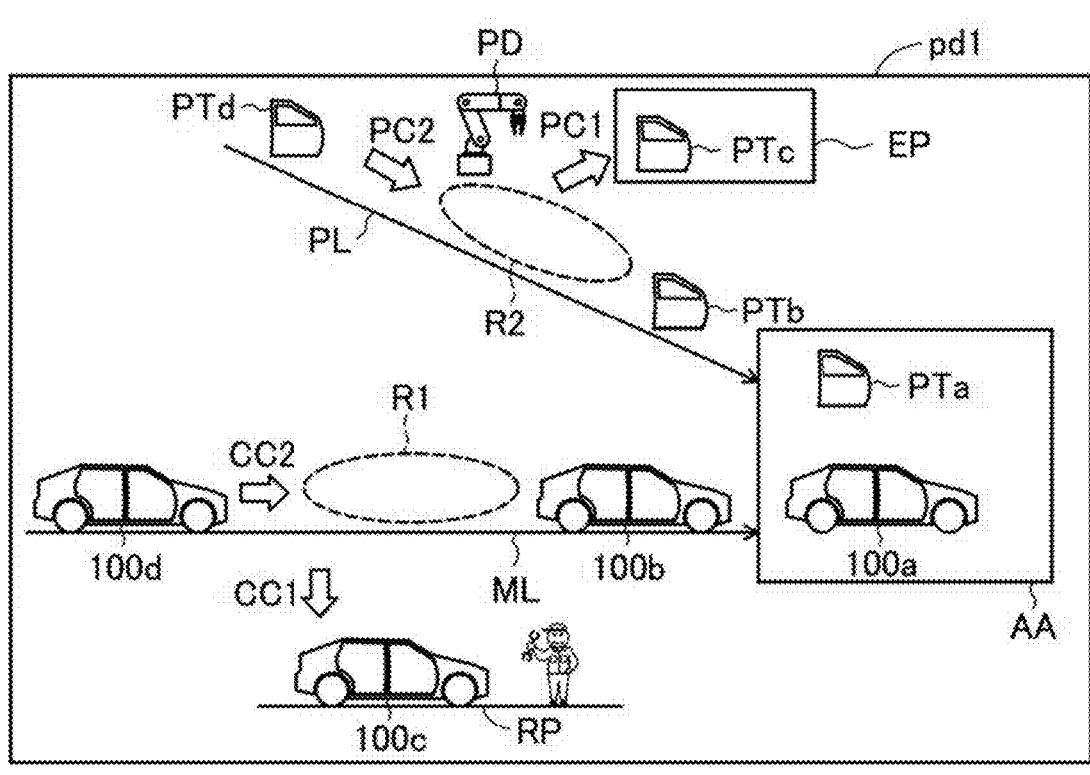
FIG. 7 is a diagram describing an example of the production process.
Figure 7:
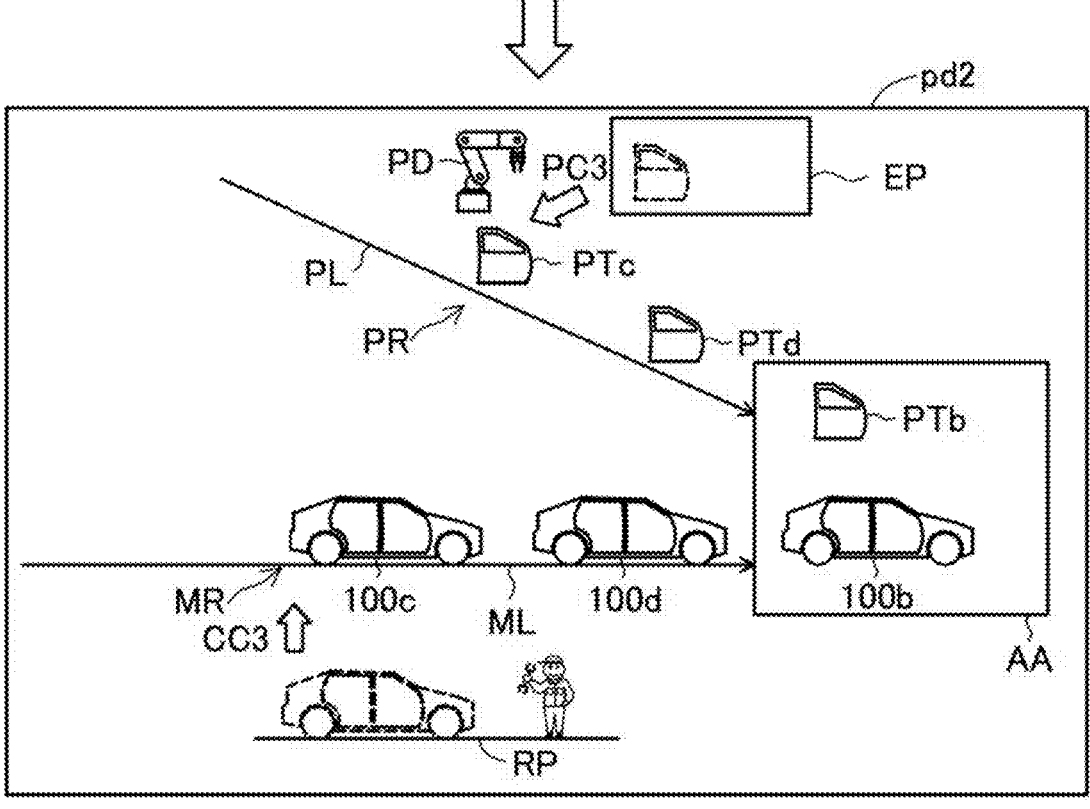

FIG. 7 is a diagram describing an example of the production process. FIG. 7 shows an example in which the vehicle 100c is a defective vehicle and the part PTc is the corresponding part. In FIG. 7, a vehicle 100 subsequent to the vehicle 100d and a part PT subsequent to the part PTd are omitted. During a period pd1 in FIG. 7, the assembly of the part PTa to the vehicle 100a is being performed in the assembly area AA. Further, during the period pd1, a repair instruction CC1, a vehicle entry instruction CC2, a part retraction instruction PC1, and a part entry instruction PC2 are executed. A period pd2 is a time period later than the period pd1. During the period pd2, the assembly of the part PTb to the vehicle 100b is being performed in the assembly area AA. Further, during the period pd2, a vehicle return instruction CC3 and a part return instruction PC3 are executed.

During the period pd1, the vehicle 100c, which is a defective vehicle, is retracted from the production line ML and moves to the repair place RP by the repair instruction CC1. As the vehicle 100c is retracted from the production line ML, a first vacant space R1 is generated in the production line ML. In the example in FIG. 7, the first vacant space R1 refers to a vacant space between the vehicle 100b, which is the preceding vehicle, and the vehicle 100d, which is the subsequent vehicle. The instruction unit 230 executes the vehicle entry instruction CC2 with respect to the vehicle 100d, thereby causing the vehicle 100d to enter the first vacant space R1.

According to the part retraction instruction PC1, the part PTc, which is the corresponding part, is removed from the parts line PL and is placed on the retracted position EP. As the part PTc is removed from the parts line PL, a second vacant space R2 is generated in the parts line PL. In the example in FIG. 7, the second vacant space R2 refers to a vacant space between the part PTb preceding to the part PTd and the part PTd as the subsequent part. The instruction unit 230 executes the part entry instruction PC2 with respect to the parts handling device PD so as to move the part PTd to the second vacant space R2, thereby causing the part PTd to enter the second vacant space R2.

During the period pd2, by executing the vehicle return instruction CC3, the vehicle 100c, which is the repaired vehicle, is made to run from the repair place RP to the production line ML, and returns to the production line ML at a return place MR on the production line ML. In the example in FIG. 7, the vehicle 100c that has returned is located upstream of the vehicle 100d, i.e., behind the vehicle 100d, in the production line ML. By executing the part return instruction PC3, the part PTc, which is the corresponding part, moves from the retracted position EP to the parts line PL, and returns to the parts line PL at an interruption position PR. In the example in FIG. 7, the part PTc that has returned is located upstream of the part PTd, i.e., behind the part PTd, in the parts line PL. After the period pd2, usually, the vehicle 100d and the part PTd arrive at the assembly area AA next, followed by the vehicle 100c and the part PTc that have returned. In the assembly area AA, after the assembly of the part PTb to the vehicle 100b is completed, the assembly of the part PTd to the vehicle 100d and the assembly of the part PTc to the vehicle 100c are performed in sequence.

According to the server 200 in the present embodiment described above, the corresponding part to be assembled to the defective vehicle, which is removed from the production line ML by the vehicle retraction instruction, is removed from the parts line PL by the part retraction instruction. Here, if the vehicle 100 is configured to be movable by unmanned driving as in the present embodiment, the vehicle 100 can be easily retracted from the production line ML before the vehicle 100 as the defective vehicle arrives at the assembly area AA. Specifically, the defective vehicle can be retracted, for example, by running by unmanned driving or transportation on the track TR using wheels without relying on unmanned driving. However, merely retracting the defective vehicle from the production line ML often results in allowing the corresponding part, which is supposed to be assembled to the defective vehicle, to unwantedly arrive at the assembly area AA, and the corresponding part may be mistakenly assembled to another vehicle 100. To address this issue, in the present embodiment, the corresponding part is removed from the parts line PL by the part retraction instruction. Therefore, it is possible to prevent such unwanted assembly of a wrong part PT to another vehicle 100 in the assembly area AA. More specifically, for example, it is possible to prevent assembly of a wrong part PT for use in a different vehicle type, color, or grade to the vehicle 100. In this way, according to the present embodiment, the assembly in the assembly area AA can be properly performed.

Further, in the present embodiment, the vehicle entry instruction is executed to instruct the vehicle subsequent to the defective vehicle to enter the first vacant space R1. The first vacant space R1 is generated when the defective vehicle is removed from the production line ML. In this way, each vehicle 100 can be moved more efficiently on the production line ML. This increases the possibility that the assembly will be performed more efficiently in the assembly area AA.

Further, in the present embodiment, the vehicle entry instruction causes the subsequent vehicle to enter the first vacant space R1 by decreasing the degree of deceleration of the subsequent vehicle to be smaller than that of the preceding vehicle. In this way, the speed of the vehicle 100 during the work steps including, for example, assembly or inspection that is performed upstream of the assembly area AA on the production line ML, can be reduced compared with the case of causing the subsequent vehicle to enter the first vacant space R1 by increasing the speed of the subsequent vehicle. As a result, for example, it is possible to prevent an excessive decrease in time that can be allocated to the work step, or an increase in speed of the vehicle 100 to be greater than the speed appropriate for the work step. In other words, it is possible to prevent the influence of high speed of the vehicle 100 on the work step. Further, it is possible to save energy required for acceleration. In addition to causing the subsequent vehicle to enter the first vacant space R1, the instruction unit 230 may also execute an instruction to cause a vehicle 100 following the subsequent vehicle to enter a vacant space generated when the subsequent vehicle enters the first vacant space R1.

Further, in the present embodiment, the part entry instruction is executed with respect to the parts handling device PD configured to be capable of changing the positions of the parts PT flowing on the parts line PL, so as to cause the part subsequent to the corresponding part to enter the second vacant space R2 that is generated when the corresponding part is removed from the parts line PL. In this way, each part PT can be moved more efficiently on the parts line PL, thereby increasing the possibility that the assembly will be performed more efficiently in the assembly area AA. In particular, the possibility that the assembly is performed more efficiently can be further increased by executing the vehicle entry instruction and the part entry instruction, as in the present embodiment. In addition to causing the subsequent part to enter the second vacant space R2, the instruction unit 230 may also execute an instruction to cause a part PT following the subsequent part to enter a vacant space generated when the subsequent part enters the second vacant space R2.

Further, in the present embodiment, since the repair instruction is executed to instruct the defective vehicle to move to the repair place RP, the defective vehicle that has been removed from the production line ML can be moved to the repair place RP for repair. In particular, in the present embodiment, since the repair place RP is identified according to the defect information, the defective vehicle can be moved to the repair place RP corresponding to its defect, thereby allowing the defective vehicle to be fixed more appropriately at the repair place RP.

Further, in the present embodiment, when the completion information regarding the defective vehicle is acquired, the vehicle return instruction is executed to instruct the repaired vehicle to enter the production line ML. This allows the repaired vehicle to return to the production line ML, thereby restarting the assembly of the part PT to the repaired vehicle using the production line ML.

Further, in the present embodiment, the return place information regarding the return of the repaired vehicle to the production line ML is used to identify the interruption position on the parts line PL of the corresponding part that has been removed from the parts line PL, and the part return instruction is executed with respect to the parts handling device PD configured to be capable of inserting the corresponding part into the interruption position, so as to insert the corresponding part into the interruption position. In this way, the corresponding part can be inserted into the parts line PL in response to the repaired vehicle being returned to the production line ML, thereby allowing the assembly of the corresponding part to the repaired vehicle to be performed more smoothly in the assembly area AA.

Further, in the present embodiment, the defective vehicle is removed from the production line ML by remote control. Therefore, the defective vehicle can be removed from the production line ML, for example, without the intervention of the worker WM.

Further, in the present embodiment, the corresponding part is removed from the parts line PL by the parts handling device PD configured to be capable of removing the parts PT from the parts line PL. Therefore, the corresponding part can be removed from the parts line PL, for example, without the intervention of the worker WM.

B. Second Embodiment

Figure 8:
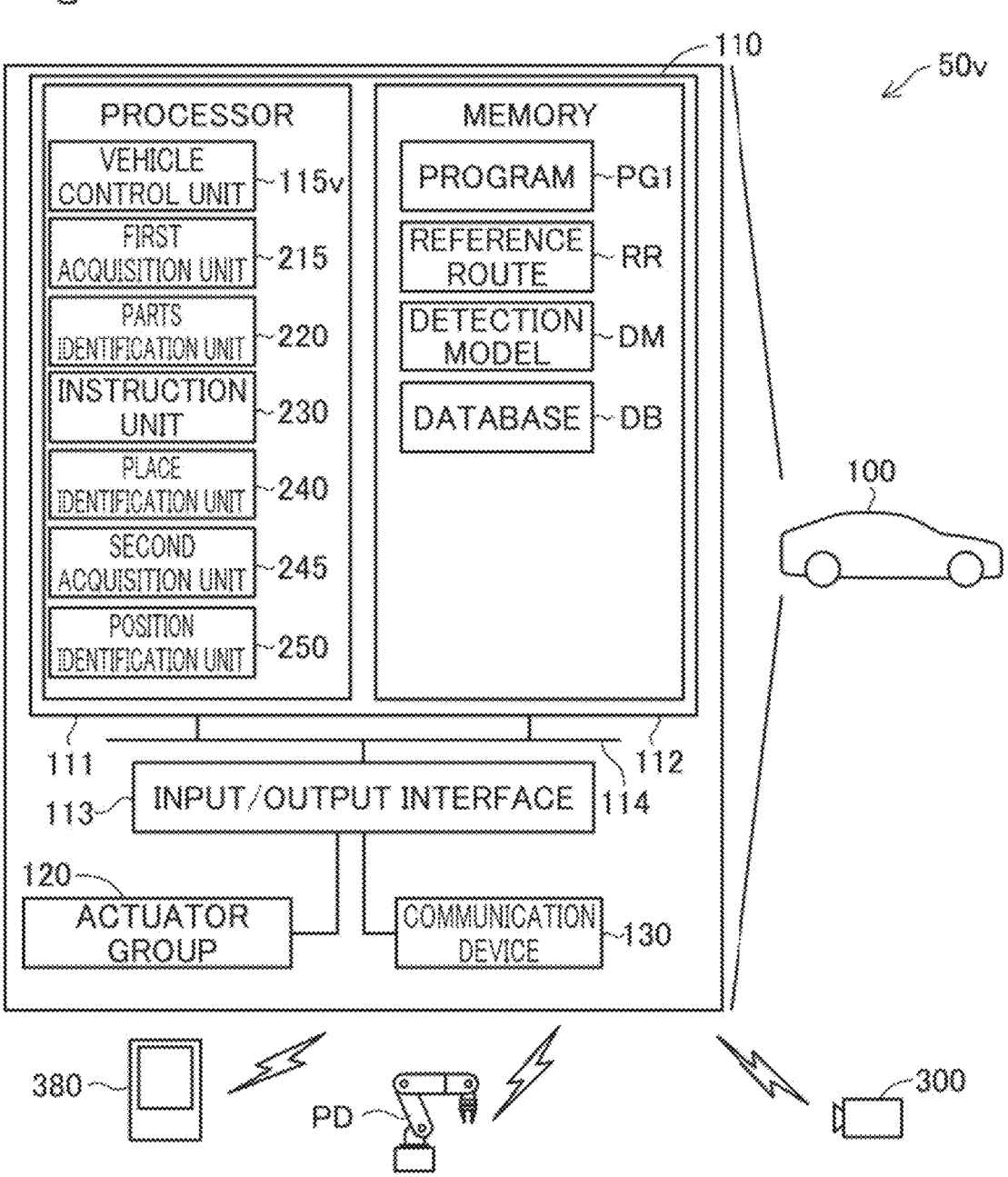
FIG. 8 is a block diagram showing a configuration of a system according to a second embodiment.

FIG. 8 is a block diagram showing a configuration of a system 50v according to a second embodiment. Unlike the system in the first embodiment, the system 50v in the present embodiment does not include the server 200. In addition, the vehicle in the present embodiment can run by autonomous control of the vehicle. Other configurations are the same as those in the first embodiment, unless otherwise specified. Since the device configuration of the vehicle in the present embodiment is the same as the vehicle 100 in the first embodiment, the vehicle in the present embodiment is also denoted as a vehicle 100 for convenience.

In the present embodiment, the communication device 130 of the vehicle 100 is capable of communicating with the external sensor 300, the terminal device 380, and the parts handling device PD. The processor 111 of the vehicle controller 110 executes the program PG1 stored in the memory 112 to enable functions as a vehicle control unit 115v, the first acquisition unit 215, the parts identification unit 220, the instruction unit 230, the place identification unit 240, the second acquisition unit 245, and the position identification unit 250. In the present embodiment, the instruction unit 230 does not function as a remote control unit. Further, the vehicle control unit 115v is capable of causing the vehicle 100 to run by autonomous control by controlling the actuator group 120 using a running control signal generated by the vehicle 100. In addition to the program PG1, a reference route RR, a detection model DM, and the database DB are stored in the memory 112.

Figure 9:
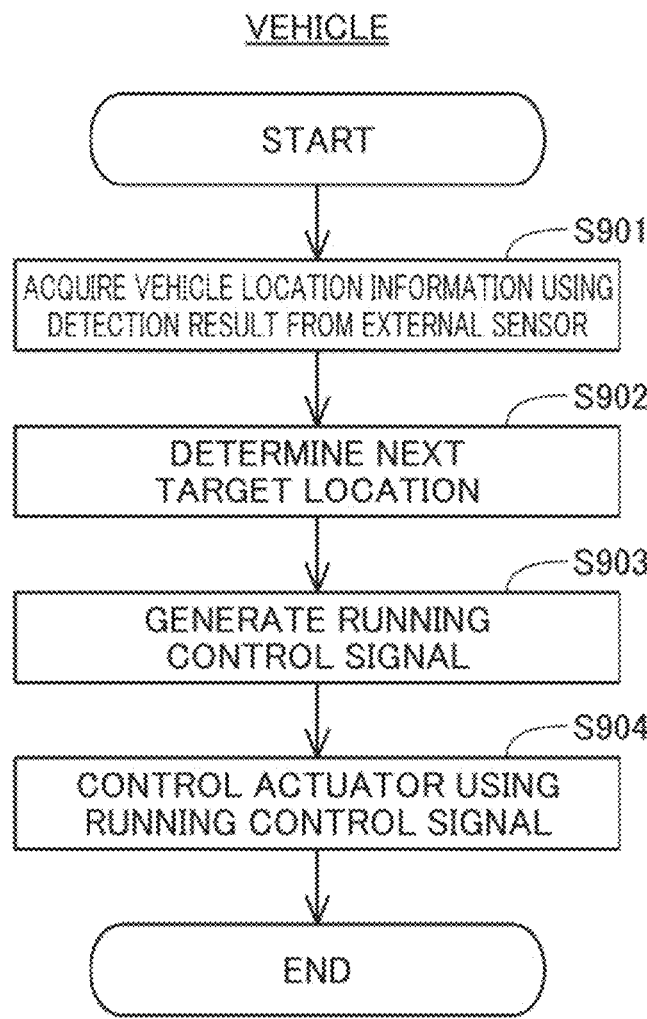
FIG. 9 is a flowchart showing procedures in the process of running control of a vehicle in the second embodiment.

FIG. 9 is a flowchart showing procedures in the process of running control of the vehicle 100 in the second embodiment. In the procedures in the process in FIG. 9, the processor 111 of the vehicle 100 functions as the vehicle control unit 115ν by executing the program PG1.

In step S901, the processor 111 of the vehicle controller 110 acquires vehicle location information using detection result output from the camera as the external sensor 300. In step S902, the processor 111 determines a target location to which the vehicle 100 is to move next. In step S903, the processor 111 generates a running control signal for causing the vehicle 100 to run to the determined target location. In step S904, the processor 111 controls the actuator group 120 using the generated running control signal, thereby causing the vehicle 100 to run by following a parameter indicated by the running control signal. The processor 111 repeats the acquisition of vehicle location information, the determination of a target location, the generation of a running control signal, and the control over the actuator in a predetermined cycle. According to the system 50 in the present embodiment, it is possible to cause the vehicle 100 to run by autonomous control without controlling the vehicle 100 remotely using the server 200.

The method of producing the vehicle 100 in the present embodiment is achieved by the same production process as in FIG. 6. In the present embodiment, however, the production process is performed not by the processor 201 of the server 200 but by the processor 111 of the vehicle controller 110, for example, at predetermined time intervals. Further, in the present embodiment, the target vehicle 100 refers to the own vehicle. Further, in the present embodiment, each instruction is executed not by the server 200 but by the instruction unit 230 of the vehicle 100. Further, in the present embodiment, the vehicle control unit 115ν of the target vehicle 100 generates and outputs running control signals upon the normal instruction in the step S125, the repair instruction in the step S135, the standby in the step S155, and the vehicle return instruction in the step S160, thereby controlling its own actuator group 120 using the running control signals. Upon execution of the vehicle entry instruction in the present embodiment, the target vehicle 100 does not have to transmit a running control signal to the subsequent vehicle; instead, for example, the target vehicle 100 may transmit to the subsequent vehicle a signal that triggers the generation of a running control signal for causing the subsequent vehicle to enter the first vacant space R1.

The vehicle 100 in the present embodiment described above also can prevent assembly of wrong parts to other vehicles 100 in the assembly area AA, in the same way the server 200 does in the first embodiment. Therefore, the assembly in the assembly area AA can be properly performed.

C. Alternative Embodiments (C1) In each of the embodiments described above, the vehicle retraction instruction is executed with respect to the defective vehicle. Optionally, the vehicle retraction instruction may not be executed with respect to the defective vehicle but with respect to, for example, a robot configured to be capable of removing the vehicle 100 from the production line ML, or a user. The vehicle retraction instruction with respect to the user may also be executed, for example, through the terminal device

380. In this case, the vehicle retraction instruction may be, for example, a control command that causes the terminal device 380 to output visual information such as text, symbols, or images, or audio information such as voice or alarms. Further, the vehicle retraction instruction with respect to the user may be executed, for example, using an output device (not shown) provided in the factory FC. The output device may be, for example, a display device that outputs visual information or a speaker or alarming device that outputs audio information. By thus executing the vehicle retraction instruction with respect to the user, the defective vehicle can be removed from the production line ML by the worker WM even in the case where, for example, the running of the defective vehicle by unmanned driving is difficult. The "case where the running by unmanned driving is difficult" includes a first case where driving by running operation is difficult and a second case where driving by running operation is possible. The defect in the first case includes, for example, a defect of the actuator group 120. The defects in the second case include, for example, defects related to the function of performing unmanned driving, and also, if the vehicle 100 can run by remote control, defects in the communication device 130.

Further, for example, the instruction unit 230 may determine whether the vehicle retraction instruction is executed with respect to the defective vehicle, or the robot or the user, according to the defect information. In this case, for example, the vehicle retraction instruction may be executed with respect to the robot or the user when the running of the defective vehicle by unmanned driving is difficult, and the vehicle retraction instruction may be executed with respect to the defective vehicle when the running of the defective vehicle by unmanned driving is not difficult.

(C2) In each of the embodiments described above, the part retraction instruction is executed with respect to the parts handling device PD, which is capable of removing the part PT from the parts line PL. Optionally, the part retraction instruction may be executed not with respect to the parts handling device PD but, for example, with respect to the user, or the conveyor device Cv capable of removing the parts PT from the parts line PL.

(C3) In each of the embodiments described above, the deceleration of the subsequent vehicle is suppressed relative to the preceding vehicle by the vehicle entry instruction, but this is not necessarily required. For example, the vehicle entry instruction may cause the subsequent vehicle to enter the first vacant space R1 by accelerating the subsequent vehicle. Further, the vehicle entry instruction may also be realized, for example, by an instruction to execute a group control that maintains an approximately-constant vehicle distance between the vehicles 100 that run in sequence.

(C4) Although the vehicle entry instruction is executed in each of the embodiments described above, the vehicle entry instruction may not be executed.

(C5) Although the part entry instruction is executed in each of the embodiments described above, the part entry instruction may not be executed.

(C6) In each of the embodiments described above, the retraction instruction is made by the repair instruction, but this is not necessarily required. For example, the retraction instruction may be an instruction different from the repair instruction. Further, for example, the repair instruction may not be executed. If the repair instruction is not executed, the defective vehicle may be, for example, disassembled or discarded without being repaired. Further, in this case, the corresponding part may be, for example, disassembled or discarded without returning to the parts line PL.

(C7) In each of the embodiments described above, the repair place RP is identified according to the defect information, but this is not necessarily required. For example, the repair place RP may be determined in advance regardless of the defect information. In this case, the server 200 or the vehicle 100 may not include the place identification unit 240.

(C8) In each of the embodiments described above, the vehicle return instruction is executed when the completion information is acquired, but this is not necessarily required. For example, the repaired vehicle may run to a place different from the assembly area AA without returning to the production line ML, and the assembly of the parts PT to the repaired vehicle may be performed at a place different from the assembly area AA. In this case, the corresponding part may be transported to the place by various transport devices or the worker WM. Further, in this case, the system 50 may not include the second acquisition unit 245.

(C9) In each of the embodiments described above, the part return instruction is executed, but the part return instruction may not be executed. For example, an instruction to supply, instead of the retracted corresponding part, a new part that fits the repaired vehicle to the parts line PL may be executed. In this case, the system 50 may not include the position identification unit 250.

(C10) In each of the embodiments described above, for example, some or all of the vehicle entry instruction, the part entry instruction, the repair instruction, the vehicle return instruction, and the part return instruction may be executed by separate functional units for executing the respective processes. For example, the vehicle entry instruction, the part entry instruction, the repair instruction, the vehicle return instruction, and the part return instruction may be executed by a vehicle entry instruction unit, a part entry instruction unit, a repair instruction unit, a vehicle return instruction unit, and a part return instruction unit. In this case, a collective functional unit representing all of these functional units corresponds to the "instruction unit" in the present disclosure.

(C11) In each of the above-described embodiments, the external sensor is not limited to the camera but may be the distance measuring device, for example. The distance measuring device is a light detection and ranging (LiDAR) device, for example. In this case, detection result output from the external sensor 300 may be three-dimensional point cloud data representing the vehicle 100. The server 200 and the vehicle 100 may acquire the vehicle location information through template matching using the three-dimensional point cloud data as the detection result and reference point cloud data, for example.

(C12) In the above-described first embodiment, the server 200 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server 200 may acquire vehicle location information, determine a target location to which the vehicle 100 is to move next, and generate a route from a current location of the vehicle 100 indicated by the acquired vehicle location information to the target location. The server 200 may generate a route to the target location between the current location and a destination or generate a route to the destination. The server 200 may transmit the generated route to the vehicle 100. The vehicle 100 may generate a running control signal in such a manner as to cause the vehicle 100 to run along the route received from the server 200 and control the actuator group 120 using the generated running control signal.

(2) The server 200 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control the actuator group 120 using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. Specifically, the internal sensor may include a camera, LiDAR, a millimeter wave radar, an ultrasonic wave sensor, a GPS sensor, an acceleration sensor, and a gyroscopic sensor, for example. For example, in the foregoing embodiment (1), the server 200 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(C13) In the above-described second embodiment, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(C14) In the above-described second embodiment, the vehicle 100 acquires vehicle location information using detection result from the external sensor. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control the actuator group 120 using the generated running control signal. In this case, the vehicle 100 is capable of running without using any detection result from an external sensor. The vehicle 100 may acquire target arrival time or traffic congestion information from outside the vehicle 100 and reflect the target arrival time or traffic congestion information in at least one of the route and the running control signal. The functional configuration of the system 50v may be entirely provided at the vehicle 100. Specifically, the processes realized by the system 50v in the present disclosure may be realized by the vehicle 100 alone.

(C15) In the above-described first embodiment, the server 200 automatically generates a running control signal to be transmitted to the vehicle 100. By contrast, the server 200 may generate a running control signal to be transmitted to the vehicle 100 in response to operation by an external operator existing outside the vehicle 100. For example, the external operator may operate an operating device including a display on which a captured image output from the external sensor 300 is displayed, steering, an accelerator pedal, and a brake pedal for operating the vehicle 100 remotely, and a communication device for making communication with the server 200 through wire communication or wireless communication, for example, and the server 200 may generate a running control signal responsive to the operation on the operating device.

(C16) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C17) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

In each of the embodiments described above, some or all of the functions and processes that are implemented by software may also be implemented by hardware. Further, some or all of the functions and processes that are implemented by hardware may also be implemented by software. Examples of the hardware used to implement various functions in each of the embodiments described above include various circuits, such as integrated circuits and discrete circuits.

The disclosure is not limited to any of the embodiments and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to a first aspect of the present disclosure, an apparatus is provided. The apparatus includes a first acquisition unit that acquires defect information regarding a defect of a moving object that moves on a production line by remote control; a parts identification unit that, in response to acquisition of the defect information, identifies a corresponding part from among a plurality of parts flowing on a parts line, the corresponding part being assembled to a defective moving object, the defective moving object being the moving object with the defect, the parts line merging with the production line at an assembly area where a part included in the plurality of parts is assembled to the moving object; and an instruction unit that executes a first instruction to remove the defective moving object from the production line and a second instruction to remove the corresponding part from the parts line.

According to the above aspect, the defective moving object is removed from the production line, and, at the same time, the corresponding part to be assembled to the defective moving object is also removed from the parts line, thereby preventing assembly of a wrong part to a moving object in the assembly area. Therefore, the assembly in the assembly area can be properly performed.

(2) In the aspect described above, the instruction unit may further execute an entry instruction to instruct a subsequent moving object to enter a first vacant space, the subsequent moving object being the moving object subsequent to the defective moving object, the first vacant space being generated by removal of the defective moving object from the production line. According to the above aspect, each moving object can be moved more efficiently on the production line.

(3) In the aspect described above, the instruction unit may cause, in the entry instruction, the subsequent moving object to enter the first vacant space by decreasing a degree of deceleration of the subsequent moving object to be smaller than a degree of deceleration of a moving object preceding to the subsequent moving object. According to the above aspect, compared with the case where the subsequent moving object is made to enter the first vacant space by increasing its speed, it is possible to suppress the influence of the high speed of the moving object on the work step performed upstream of the assembly area in the production line.

(4) In the aspect described above, the instruction unit may further execute a part entry instruction with respect to a device configured to be capable of changing positions of the parts flowing on the parts line, the part entry instruction being to cause a part subsequent to the corresponding part to enter a second vacant space, the second vacant space being generated by removal of the corresponding part from the parts line. According to the above aspect, each part can be moved more efficiently on the parts line.

(5) In the aspect described above, the instruction unit may further execute a repair instruction with respect to the defective moving object, the repair instruction being to move the defective moving object to a repair place where the defect is fixed. According to the above aspect, it is possible to allow the defective moving object that has been removed from the production line to move to a repair place for repair.

(6) The aspect described above may further include a place identification unit that identifies the repair place according to the defect information. The repair instruction may be an instruction to move the defective moving object to the identified repair place. According to the above aspect, the defective moving object can be moved to a repair place corresponding to the defect, thereby allowing the defective moving object to be fixed more appropriately at the repair place.

(7) The aspect described above may further include a second acquisition unit that acquires completion information regarding completion of the repair. In response to acquisition of the completion information, the instruction unit may further execute an instruction with respect to a repaired moving object, the instruction being to cause the repaired moving object to enter the production line, the repaired moving object being the moving object in which the repair has been completed. According to the above aspect, it is possible to allow the repaired moving object to return to the production line.

(8) The aspect described above may include a position identification unit that identifies an interruption position on the parts line of the corresponding part that has been removed from the parts line, using information indicating a place where the repaired moving object enters the production line. The instruction unit may further execute a part return instruction with respect to a device configured to be capable of inserting the parts into the interruption position, the part return instruction being to insert the corresponding part that has been removed from the parts line into the interruption position. According to the above aspect, the corresponding part can be inserted into the parts line in response to the repaired moving object being returned to the production line, thereby allowing the assembly of the corresponding part to the repaired moving object to be performed more smoothly in the assembly area.

(9) In the aspect described above, the first retraction instruction may be an instruction to be executed with respect to the defective moving object and to remove the defective moving object from the production line by the remote control. According to the above aspect, the defective moving object can be removed from the production line, for example, without intervention of workers.

(10) In the aspect described above, the first retraction instruction may be an instruction to be executed with respect to a terminal device. According to the above aspect, it is possible to remove the defective moving object from the production line, for example, by a worker having a terminal device.

(11) In the aspect described above, the second retraction instruction may be an instruction to be executed with respect to a device configured to be capable of removing the parts from the parts line. According to the above aspect, the corresponding part can be removed from the parts line, for example, without intervention of workers.

(12) According to a second aspect of the present disclosure, a moving object is provided. The moving object includes an acquisition unit that acquires defect information regarding a defect of the moving object that moves on a production line by unmanned driving; a parts identification unit that, in response to acquisition of the defect information, identifies a corresponding part from among a plurality of parts flowing on a parts line, the corresponding part being assembled to the moving object, the parts line merging with the production line at an assembly area where a part included in the plurality of parts is assembled to the moving object; and an instruction unit that executes an instruction to remove the moving object from the production line and an instruction to remove the corresponding part from the parts line.

In addition to the aspects described above including devices and moving objects, the present disclosure may be implemented, for example, in the forms of a system, a method of producing a moving object, a method of controlling a moving object, a program, a non-transitory storage medium storing a program, and a program product. The program product may be provided, for example, as a storage medium storing the program, or as a program product that can be distributed through a network.

What is claimed is:

1. An apparatus comprising:

a first acquisition unit that acquires defect information regarding a defect of a moving object that moves on a production line by remote control;

a parts identification unit that, in response to acquisition of the defect information, identifies a corresponding part from among a plurality of parts flowing on a parts line, the corresponding part being assembled to a defective moving object, the defective moving object being the moving object with the defect, the parts line merging with the production line at an assembly area where a part included in the plurality of parts is assembled to the moving object; and an instruction unit that executes a first retraction instruction to remove the defective moving object from the production line and a second retraction instruction to remove the corresponding part from the parts line.

2. The apparatus according to claim 1, wherein the instruction unit further executes an entry instruction to instruct a subsequent moving object to enter a first vacant space, the subsequent moving object being the moving object subsequent to the defective moving object, the first vacant space being generated by removal of the defective moving object from the production line.

3. The apparatus according to claim 2, wherein the instruction unit causes, in the entry instruction, the subsequent moving object to enter the first vacant space by decreasing a degree of deceleration of the subsequent moving object to be smaller than a degree of deceleration of a moving object preceding to the subsequent moving object.

4. The apparatus according to claim 1, wherein the instruction unit further executes a part entry instruction with respect to a device configured to be capable of changing positions of the parts flowing on the parts line, the part entry instruction being to cause a part subsequent to the corresponding part to enter a second vacant space, the second vacant space being generated by removal of the corresponding part from the parts line.

5. The apparatus according to claim 1, wherein the instruction unit further executes a repair instruction with respect to the defective moving object, the repair instruction being to move the defective moving object to a repair place where the defect is fixed.

6. The apparatus according to claim 5, further comprising a place identification unit that identifies the repair place according to the defect information, wherein the repair instruction is an instruction to move the defective moving object to the identified repair place.

7. The apparatus according to claim 5, further comprising a second acquisition unit that acquires completion information regarding completion of the repair, wherein, in response to acquisition of the completion information, the instruction unit further executes an instruction with respect to a repaired moving object, the instruction being to cause the repaired moving object to enter the production line, the repaired moving object being the moving object in which the repair has been completed.

8. The apparatus according to claim 7, comprising a position identification unit that identifies, an interruption position on the parts line of the corresponding part that has been removed from the parts line, using information indicating a place where the repaired moving object enters the production line, wherein the instruction unit further executes a part return instruction with respect to a device configured to be capable of inserting the parts into the interruption position, the part return instruction being to insert the corresponding part that has been removed from the parts line into the interruption position.

9. The apparatus according to claim 1, wherein the first retraction instruction is an instruction to be executed with respect to the defective moving object and to remove the defective moving object from the production line by the remote control.

10. The apparatus according to claim 1, wherein the first retraction instruction is an instruction to be executed with respect to a terminal device.

11. The apparatus according to claim 1, wherein the second retraction instruction is an instruction to be executed with respect to a device configured to be capable of removing the parts from the parts line.

12. A moving object, comprising:

an acquisition unit that acquires defect information regarding a defect of the moving object that moves on a production line by unmanned driving;

a parts identification unit that, in response to acquisition of the defect information, identifies a corresponding part from among a plurality of parts flowing on a parts line, the corresponding part being assembled to the moving object, the parts line merging with the production line at an assembly area where a part included in the plurality of parts is assembled to the moving object; and an instruction unit that executes an instruction to remove the moving object from the production line and an instruction to remove the corresponding part from the parts line.

13. A method of producing a moving object, comprising:

a step of acquiring defect information regarding a defect of a moving object that moves on a production line by unmanned driving;

a step of identifying, in response to acquisition of the defect information, a corresponding part from among a plurality of parts flowing on a parts line, the corresponding part being assembled to a defective moving object with the defect, the parts line merging with the production line at an assembly area where a part included in the plurality of parts is assembled to the moving object; and a step of executing an instruction to remove the defective moving object from the production line and an instruction to remove the corresponding part from the parts line.

* * * * *